(12) United States Patent
Lin

(10) Patent No.: US 7,431,607 B2
(45) Date of Patent: Oct. 7, 2008

(54) SHOCKPROOF IMAGE-STORING DEVICE

(75) Inventor: Julian Lin, Taipei (TW)

(73) Assignee: VTC Electronics Corporation, Taipei (TW)

( * ) Notice: Subject to any disclaimer, the term of this patent is extended or adjusted under 35 U.S.C. 154(b) by 512 days.

(21) Appl. No.: 11/294,587

(22) Filed: Dec. 6, 2005

(65) Prior Publication Data

US 2007/0128947 A1 Jun. 7, 2007

(51) Int. Cl.
*H01R 4/38* (2006.01)
(52) U.S. Cl. .................. 439/382; 439/383; 439/378
(58) Field of Classification Search ................ 439/378, 439/382–385
See application file for complete search history.

(56) References Cited

U.S. PATENT DOCUMENTS 4,767,350 A * 8/1988 Cooper et al. ............... 439/271
5,032,088 A * 7/1991 Kuramitsu .................. 439/378
6,422,892 B1 * 7/2002 Chen et al. .................. 439/378
6,494,735 B1 * 12/2002 Chen et al. .................. 439/378

* cited by examiner

Primary Examiner—Tho D Ta
(74) Attorney, Agent, or Firm—Muncy, Geissler, Olds, & Lowe PLLC

(57) ABSTRACT

A shockproof image-storing device has a mounting guide, a socket assembly and a memory module. The mounting guide is a hollow rectangular parallelepiped and has two sides and two mounting tabs. Each mounting tab has a connecting rod. The socket assembly has a front face, a rear face, a socket, two alignment prongs, two mounting collars, two resilient elements and a backing panel. The socket and alignment prongs are formed on the front face. The mounting collars are mounted on the rear face correspond to the connecting rods. The resilient elements are mounted around the mounting collars, and the backing panel is connected to the connecting rods. The memory module has a rear end, a connector and two alignment holes. The connector is mounted on the rear end and corresponds to the socket. The alignment holes are formed in the rear end and correspond to the alignment prongs.

4 Claims, 6 Drawing Sheets

SHOCKPROOF IMAGE-STORING DEVICE

BACKGROUND OF THE INVENTION

1. Field of the Invention

The present invention relates to a shockproof image-storing device, and more particularly to an image-storing device having a resilient elastomer structure to prevent parts or attachments of the image-storing device from breaking or loosening when subjected to a shock.

2. Description of Related Art

Digital video recorders and digital cameras are mounted in a variety of places and facilities, even in vehicles. With reference to FIGS. 5 and 6, a conventional digital video recorder generally has an image-storing device (50). An image-storing device (50) stores digital image data from a source (not shown) of digital image data and comprises a mounting guide (80), a socket assembly (60) and a memory module (70).

The mounting guide (80) is a hollow rectangular parallelepiped and has two sides (not numbered), an open front (not numbered), an open rear (not numbered) and two mounting tabs (not numbered). The mounting tabs are formed respectively on and extend out perpendicular from the sides, and each mounting tab has a threaded hole (not shown).

The socket assembly (60) is connected to the source of digital image data and to the open rear of the mounting guide (80), which has an inside surface (not numbered), two ends (not numbered), a front face (not shown), a socket (61), two mounting tabs (not numbered) and two screws (not numbered). The socket (61) is connected to the source of digital image data and protrudes from the front face. The mounting tabs are formed respectively at the ends, and each mounting tab has a through hole (not shown). The screws are mounted respectively through the through holes in the mounting tabs on the socket assembly (60) and screw respectively into the threaded holes in the mounting tabs on the mounting guide (80) to hold the socket assembly (60) securely on the mounting guide (80).

The memory module (70) is a rectangular parallelepiped, corresponds to and is mounted inside the mounting guide (80) through the open front of the mounting guide (80) and has an inner end (not numbered), an outer end (not numbered) and a connector (71). The outer end protrudes from the open front of the mounting guide (80) when the memory module (70) is mounted inside the mounting guide (80). The connector (71) is formed on and protrudes from the inner end of the memory module (70), connects electronically to the socket (61) and passes digital image data to and from the memory module (70).

When vehicles equipped with a digital video recorder are jolted badly, image-storing devices (50) installed in the digital video recorders can be subjected to severe shocks and vibration. When a shock or severe vibration is subjected to the image-storing device (50), the memory module (70) will shake in the mounting guide (80) and strike the inside surface of the mounting guide (80). The connector (71) may disconnect from the socket (61) and interrupt digital image data flowing to the image-storing device (50). Furthermore, the connector (71), the socket (61) or both may be damaged.

To overcome the shortcomings, the present invention provides a shockproof image-storing device to obviate or mitigate the aforementioned problems.

SUMMARY OF THE INVENTION

An objective of the present invention is to provide a shockproof image-storing device to keep components of the image-storing device from disconnecting or being damaged when subjected to severe vibration or shock.

To achieve the objective, a shockproof image-storing device comprises a mounting guide, a socket assembly and a memory module.

The mounting guide is a hollow rectangular parallelepiped and has two sides, an open front, an open rear and two mounting tabs. The mounting tabs are formed respectively on and extend out perpendicular from the sides, and each mounting tab has a connecting rod.

The socket assembly is connected to the source of digital image data and to the open rear of the mounting guide and has two ends, a front face, a rear face, a socket, two alignment prongs, two mounting collars, two resilient elements and a backing panel. The socket is connected to the source of digital image data, protrudes from the front face and has two ends. The alignment prongs protrude from the front face respectively outside the ends of the socket. The mounting collars are formed respectively on the ends of the socket assembly. The resilient elements are mounted respectively around the mounting collars and abut the ends of the socket assembly. The backing panel is connected to the connecting rods and holds the resilient elements between the ends of the socket assembly and the backing panel, which allows the socket assembly to float on the resilient elements relative to the backing panel. The fasteners connect the backing panel to the connecting rods.

The memory module is a box with a non-volatile memory device and has an outer end, an inner end, two sides, a connector and two alignment holes. The connector is attached to and protrudes from the inner end and engages the socket when the memory module is pressed into the mounting guide. The alignment holes are formed in the inner end, correspond to the alignment prongs on the socket assembly and ensure the connector is properly aligned with the socket.

The floating socket assembly absorbs shock applied to the shockproof image-storing device, and the alignment prongs mounted in the alignment holes strengthen the connection of socket and connector to keep the connector and the socket from separating or being damaged.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
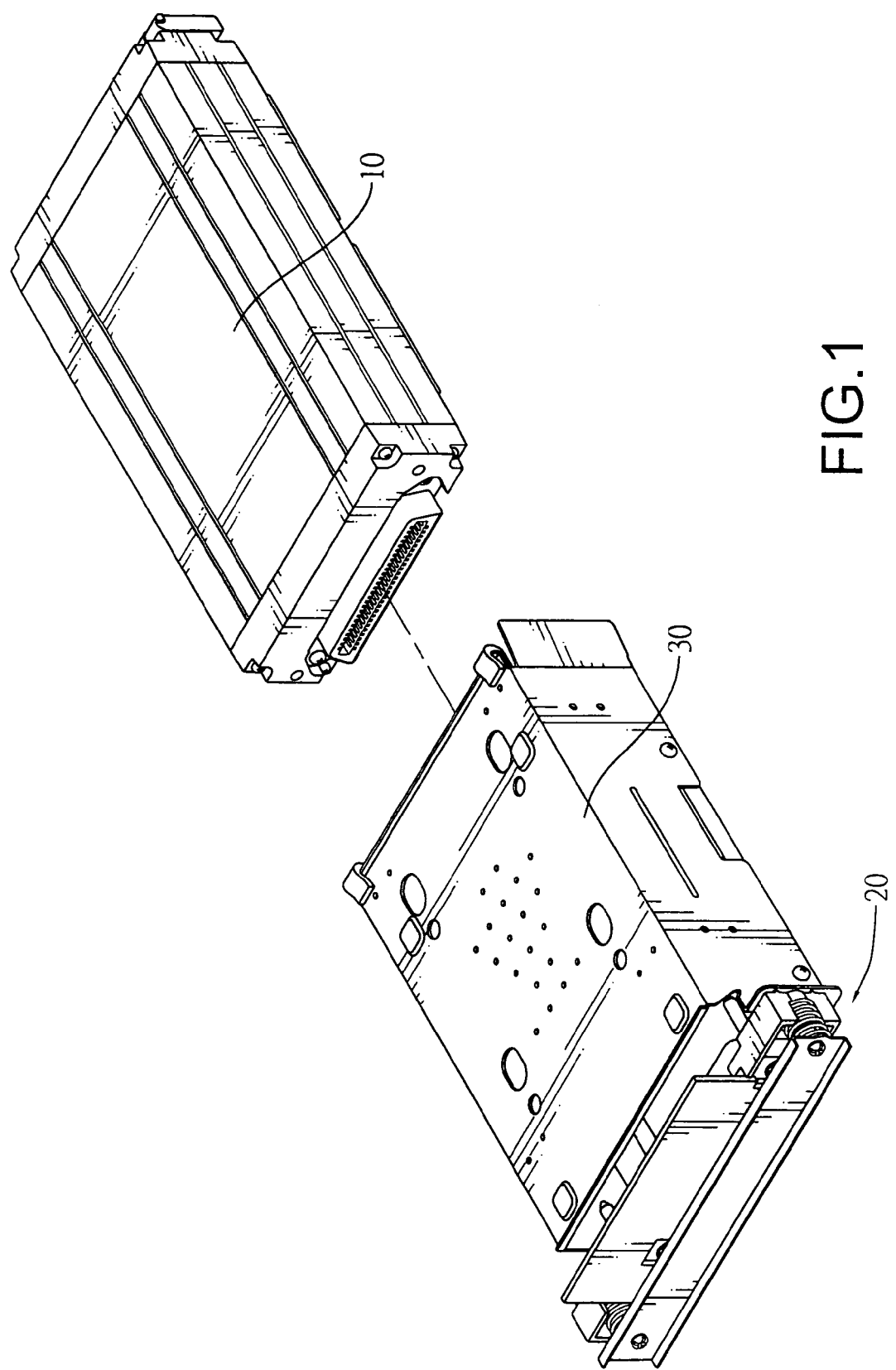
FIG. 1 is a partially exploded perspective view of the shockproof image-storing device in accordance with the present invention.
Figure 2:
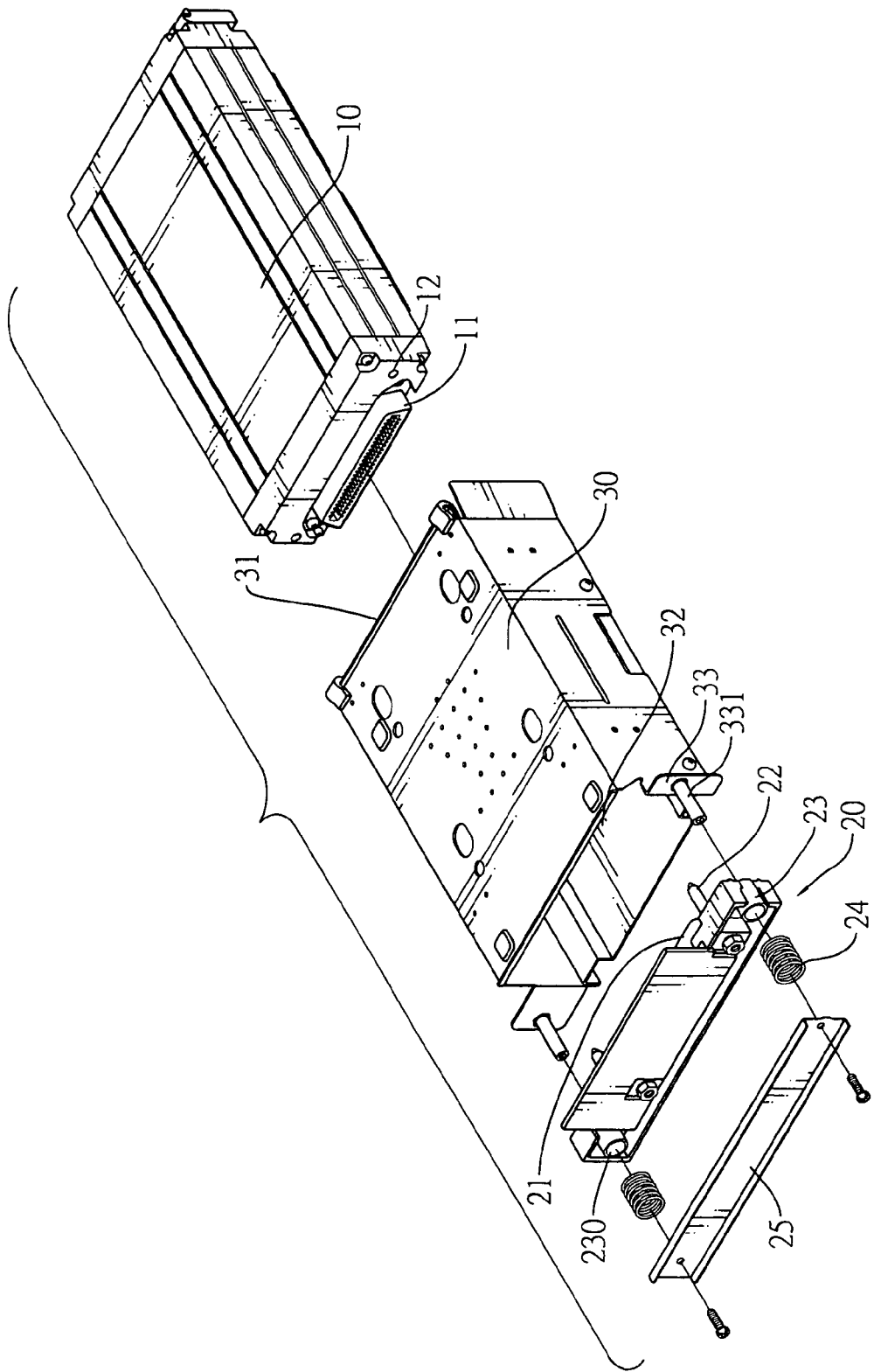
FIG. 2 is an exploded perspective view of the shockproof image-storing device in FIG. 1.

With reference to FIGS. 1 and 2, the shockproof image-storing device in accordance with the present invention comprises a mounting guide (30), a socket assembly (20) and a memory module (10).

The mounting guide (30) is a hollow rectangular parallelepiped and has two sides, an open front (31), an open rear (32) and two mounting tabs (33). The mounting tabs (33) are formed respectively on and extend out perpendicular from the sides, and each mounting tab (33) has a rear face and a connecting rod (331). The connecting rods (331) are attached respectively to and protrude from the rear faces of the mounting tabs (33) and may be a tube, and each connecting rod (331) has a proximal end, a distal end and an optional threaded hole. The proximal ends are connected respectively to the rear faces of the mounting tabs (33). The threaded holes are coaxially formed respectively in the distal ends.

The socket assembly (20) is connected to a source of digital image data and to the open rear (32) of the mounting guide (30) and has two ends, a front face, a rear face, a socket (21), two alignment prongs (22), two mounting collars (23), two resilient elements (24), a backing panel (25) and two optional fasteners.

The front face has a middle, two ends and an integrated circuit (IC). The IC is in the middle of the front face.

The socket (21) is connected to a source of digital image data, protrudes from the front face and has two ends.

The alignment prongs (22) protrude from the front face respectively outside the ends of the socket (21).

The mounting collars (23) are formed respectively on the ends of the socket assembly (20), protrude from the rear face of the socket assembly (20) and are mounted respectively around the connecting rods (331) on the mounting tabs (33) of the mounting guide (30).

The resilient elements (24) are mounted respectively around the mounting collars (23), abut the rear face of the socket assembly (20) and may be elastomeric tubes or springs.

Figure 3:
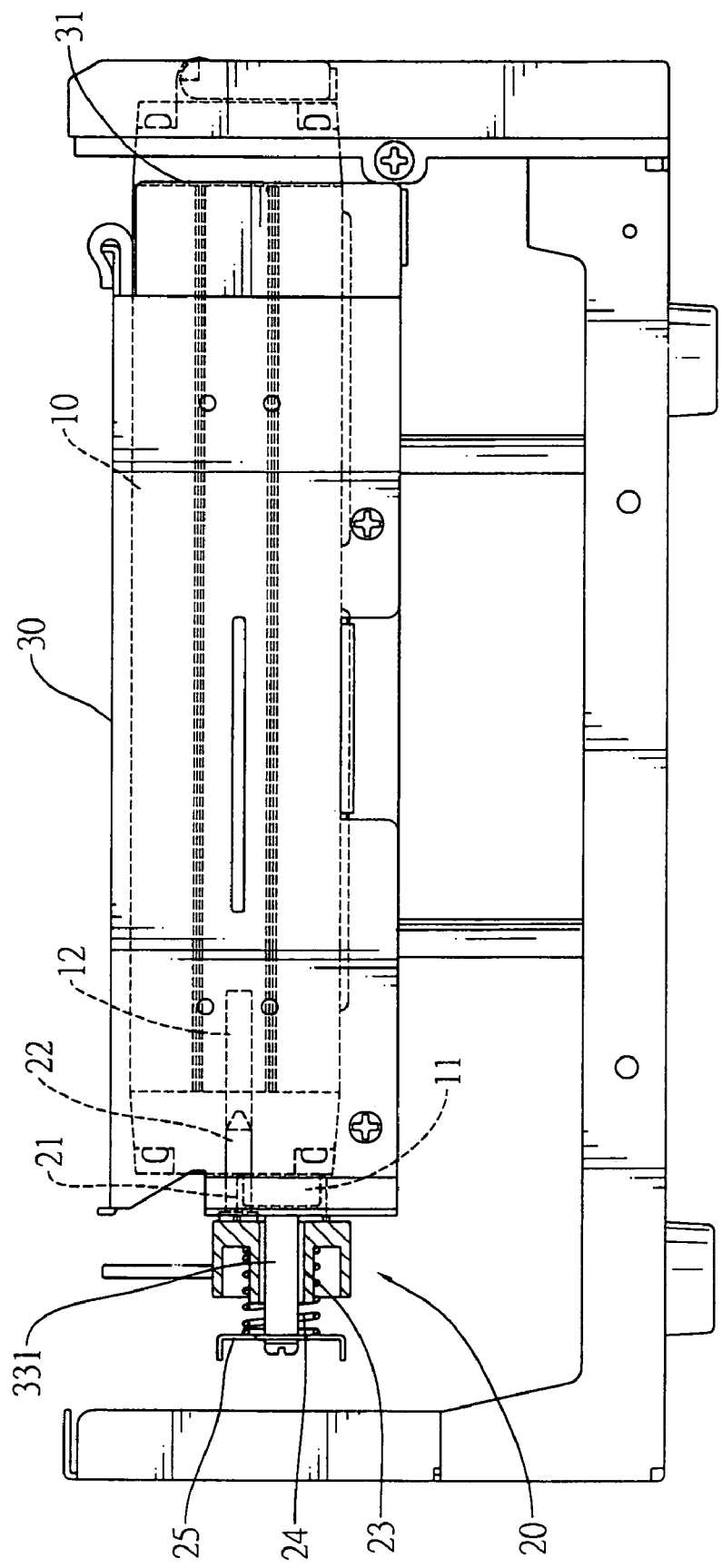
FIG. 3 is a side view in partial section of the shockproof image-storing device in FIG. 1 with internal elements shown in phantom lines.
Figure 4:
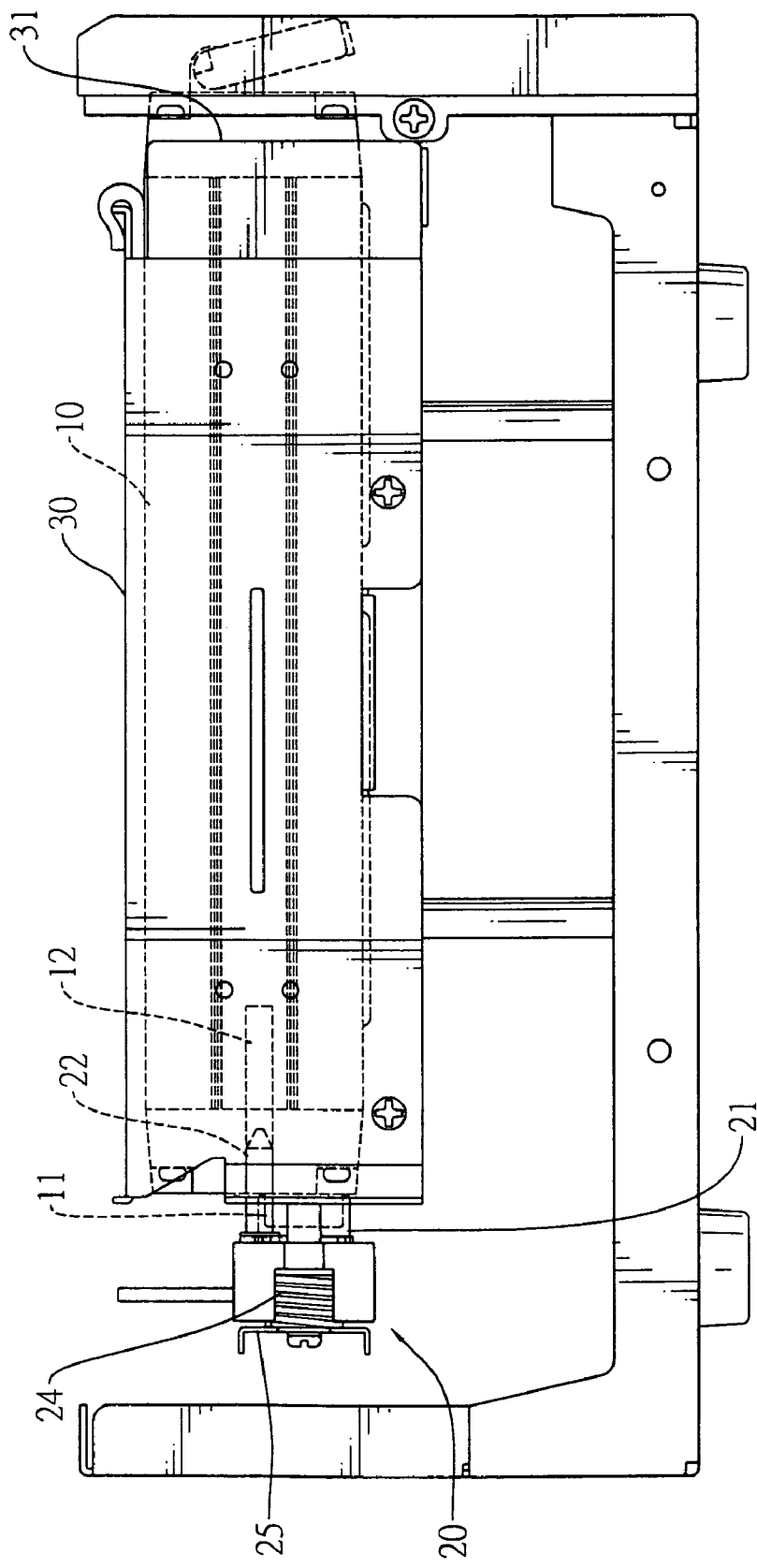
FIG. 4 is an operational side view of the shockproof image-storing device in FIG. 3 with a memory module being connected to a socket assembly.
Figure 5:
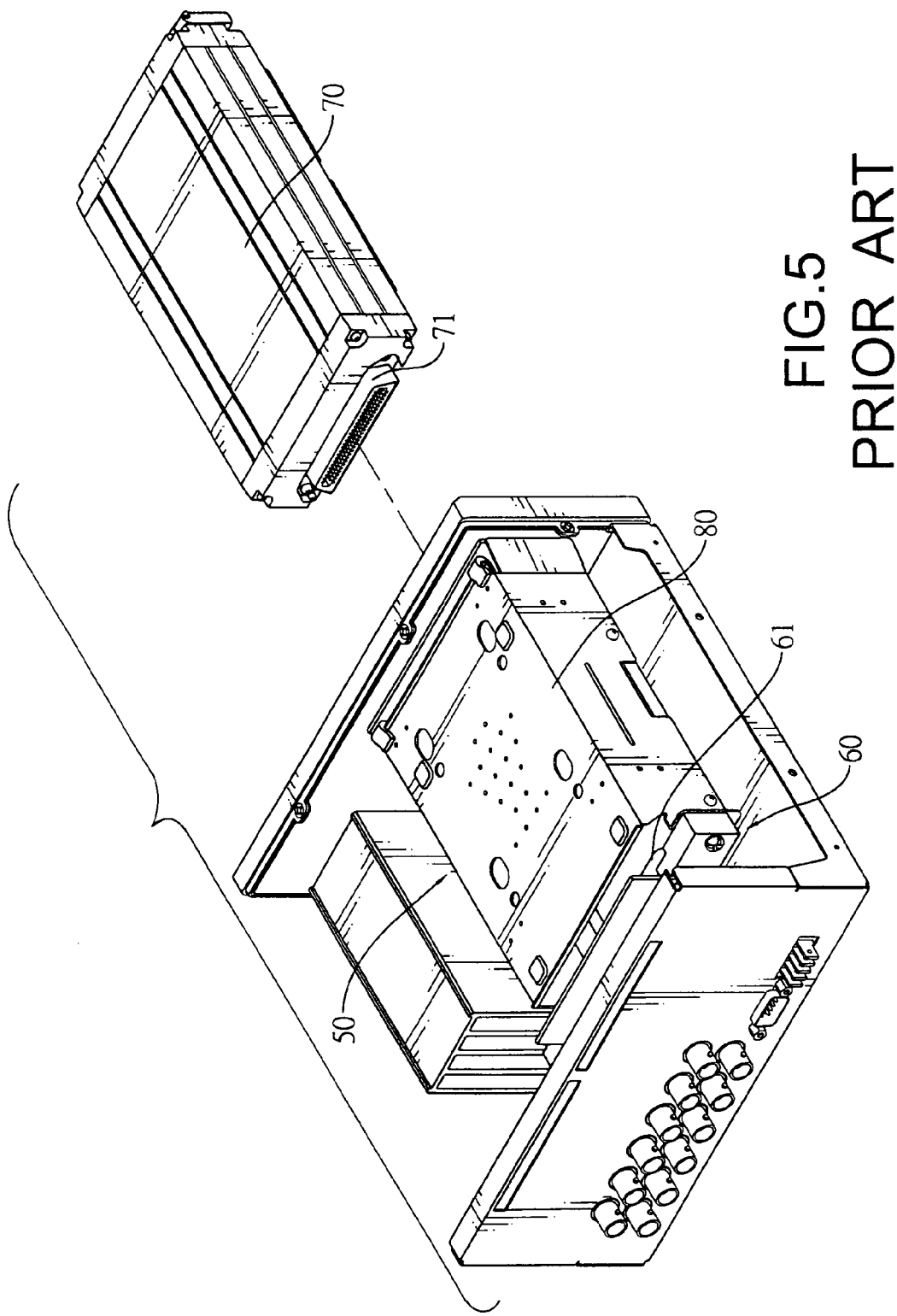
FIG. 5 is a partially exploded perspective view of a conventional digital video recorder in accordance with the prior art.
Figure 6:
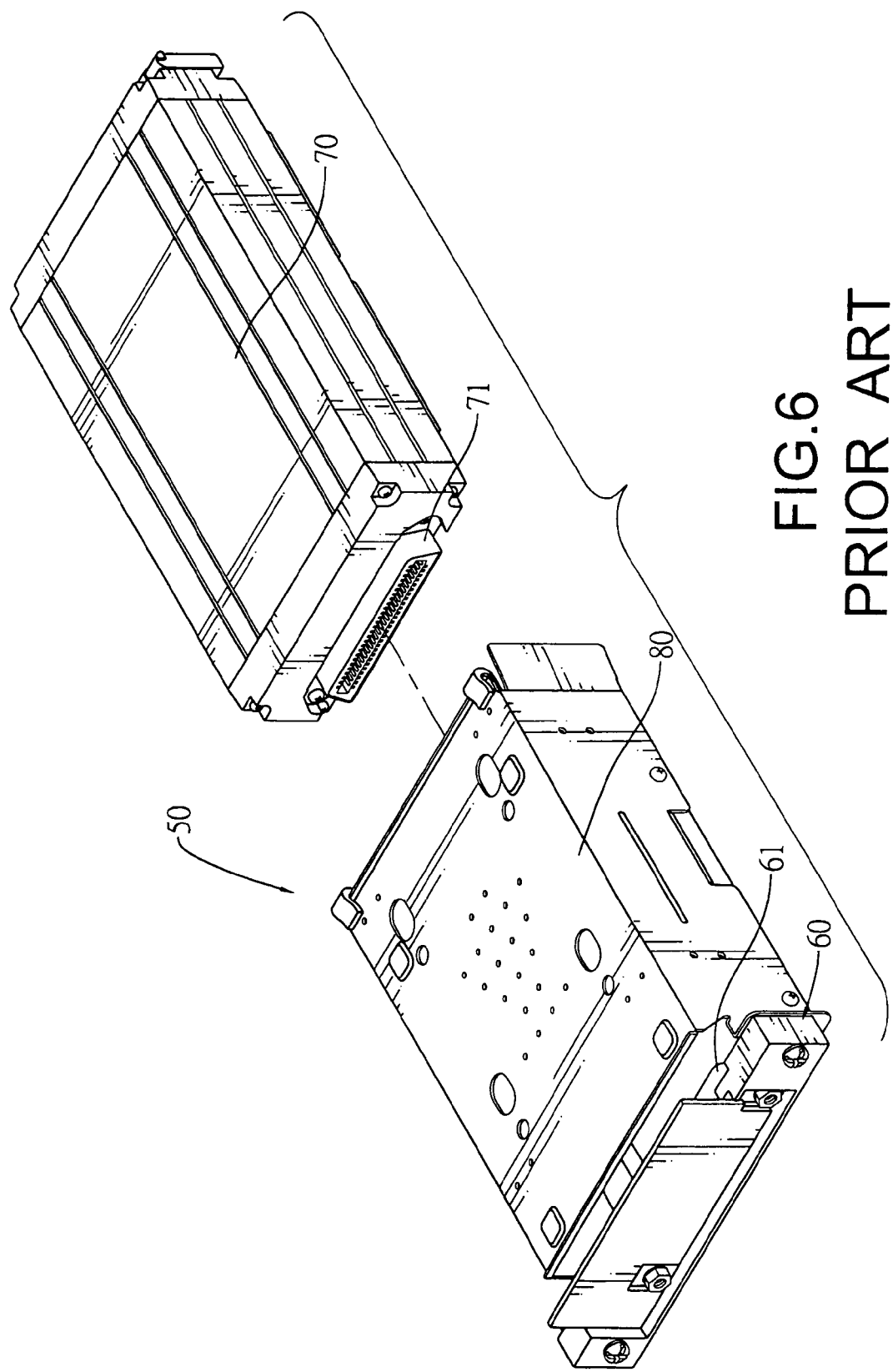
FIG. 6 is a partially exploded perspective view of a conventional image-storing device in FIG. 5.

With further reference to FIGS. 3 and 4, the backing panel (25) is connected to the distal ends of the connecting rods (331) and holds the resilient elements (24) between the ends of the socket assembly (20) and the backing panel (25), which allows the socket (21) to float on the resilient elements (24) relative to the backing panel (25). Having the socket assembly (20) float on the resilient elements (24) absorbs shock applied to the shockproof image-storing device and keeps the connector (11) and the socket (21) from separating or being damaged. The backing panel (25) may be connected to the connecting rods (331) with conventional techniques such as welding, riveting and the like.

The fasteners connect the backing panel (25) to the connecting rods (331) and may be screws, bolts, rivets and the like.

The memory module (10) is a box with a non-volatile memory device and has an outer end, an inner end, two sides, a connector (11) and two alignment holes (12). The connector (11) is attached to and protrudes from the inner end and engages the socket (21) when the memory module (10) is pressed into the mounting guide (30). The alignment holes (12) are formed in the inner end, correspond respectively to and engage the alignment prongs (22) on the socket assembly (20) to ensure the connector (11) is properly aligned with the socket (21) and strengthen the socket (21) and connector (11) assembly to keep the connector (11) and socket (21) from separating.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A shockproof image-storing device comprising
   a mounting guide being a hollow rectangular parallelepiped and having
      two sides;
      an open front;
      an open rear; and
      two mounting tabs formed respectively on and extending out perpendicular from the sides, and each mounting tab having
         a rear face; and
         a connecting rod attached to and protruding from the rear face of the mounting tab and having
            a proximal end connected to the rear face; and
            a distal end;
   a socket assembly adapted to be connected to a source of digital image data, connected to the open rear of the mounting guide and having
      two ends;
      a front face having two ends;
      a rear face;
      a socket connected to a source of digital image data, protruding from the front face and having two ends;
      two alignment prongs protruding from the front face respectively outside the ends of the socket;
      two mounting collars formed respectively on the ends of the socket assembly, protruding from the rear face of the socket assembly and mounted respectively around the connecting rods on the mounting tabs of the mounting guide;
      two resilient elements mounted respectively around the mounting collars and abutting the rear face of the socket; and
      a backing panel connected to the distal ends of the connecting rods and holding the resilient elements between the ends of the socket assembly and the backing panel; and
   a memory module having
      an outer end;
      an inner end;
      two sides;
      a connector attached to and protruding from the inner end and engaging the socket when the memory module is pressed into the mounting guide; and
      two alignment holes formed in the inner end, corresponding respectively to and engaging the alignment prongs on the socket assembly to ensure that the connector is properly aligned with the socket.

2. The shockproof image-storing device as claimed in claim 1, wherein each connecting rod further has a threaded hole, and the threaded holes are coaxially formed respectively in the distal ends.

3. The shockproof image-storing device as claimed in claim 1, wherein the resilient elements of the socket assembly are springs.

4. The shockproof image-storing device as claimed in claim 1, wherein the socket assembly further has two fasteners connecting the backing panel to the connecting rods.

* * * * *